May 17, 1955
J. V. LONGAN
2,708,447
MEAT CHOPPER PLATE CLEANER
Filed Jan. 13, 1953
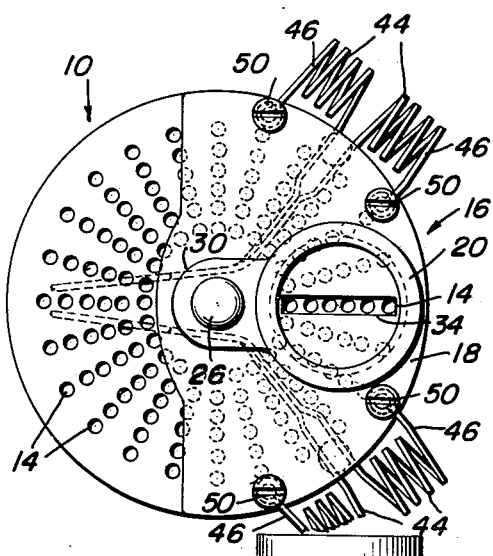
Fig. 1
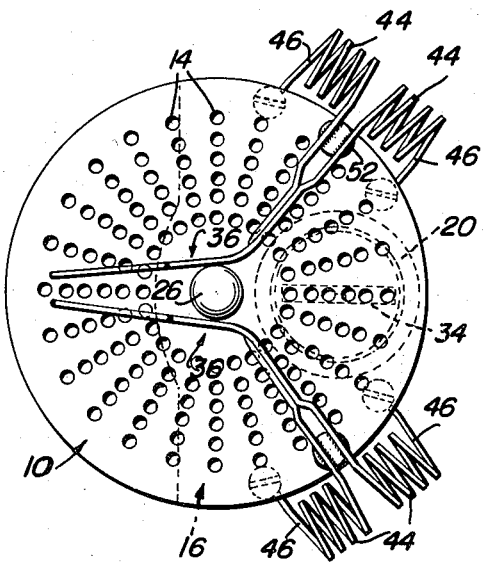
Fig. 2
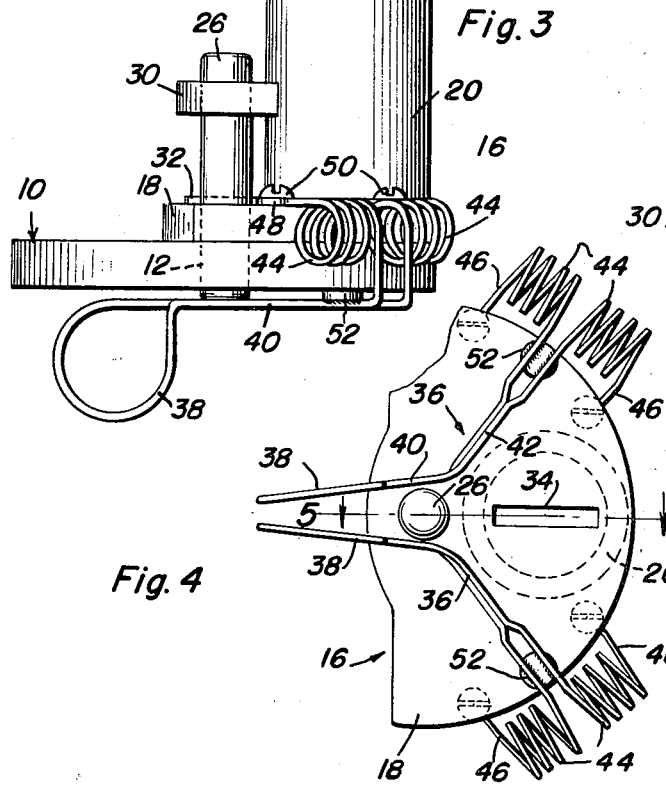
Fig. 3
Fig. 5
Fig. 4
John V. Longan
INVENTOR.
BY *Clarence A. O'Brien*
*and Harvey B. Jacobson*
Attorneys

United States Patent Office 2,708,447
Patented May 17, 1955

2,708,447
MEAT CHOPPER PLATE CLEANER

John V. Longan, Archer City, Tex.

Application January 13, 1953, Serial No. 331,053

4 Claims. (Cl. 134—157)

This invention relates in general to improved cleaning devices, and more specifically to a cleaner for meat chopper plates.

Meat choppers or grinders are provided with chopper plates having a plurality of apertures therein through which meat or other similar substances being ground are extruded. After a meat grinding operation particles of the meat remain within the numerous apertures of the meat chopper plate and it is necessary for sanitary purposes to thoroughly clean the meat chopper plate. Due to the fact that the meat chopper plate is provided with a plurality of such apertures it is a tiresome and time consuming task to clean each aperture individually with a brush or the like.

Therefore, it is the primary object of this invention to provide an improved meat chopper plate cleaner which may be utilized to quickly and easily clean each and every aperture of a meat chopper plate.

Another object of this invention is to provide an improved meat chopper plate cleaner which may be associated with a water supply which is pressurized whereby passage of water under pressure through the meat chopper plate cleaner will result in the cleaning of the individual apertures of the meat chopper plate.

Another object of this invention is to provide an improved meat chopper plate in the form of a mounting plate having carried thereby means for association with a pressurized liquid supply, said mounting plate having a mounting pin thereon which is intended to receive a meat chopper plate for rotation whereby apertures of the meat chopper plate may be selectively communicated with a pressurized liquid source.

A further object of this invention is to provide means for resiliently mounting a meat chopper plate on a meat chopper plate holder whereby the meat chopper plate may be conveniently rotated relative to a pressurized fluid source to selectively communicate apertures of a meat chopper plate with the fluid source to clean the individual apertures thereof.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a top plan view of the meat chopper plate cleaner which is the subject of this invention and shows the same having mounted thereon a meat chopper plate to be cleaned;

Figure 2 is a bottom plan view of the meat chopper plate cleaner and meat chopper plate of Figure 1 and shows the arrangement of resilient means for rotating the meat chopper plate in position on the meat chopper plate cleaner;

Figure 3 is a side elevational view of the meat chopper plate and meat chopper plate cleaner of Figure 1;

Figure 4 is a fragmentary bottom plan view of the meat chopper plate cleaner and shows the specific construction of resilient means for retaining the meat chopper plate in position; and Figure 5 is a fragmentary vertical sectional view taken substantially upon the plane indicated by the section line 5—5 of Figure 4 and shows the specific construction of the conduit for attachment to a pressurized liquid supply, also shown are the specific details of a mounting pin for a meat chopper plate.

Referring now to the drawings in detail, it will be seen that there is illustrated a conventional meat chopper plate which is referred to in general by the reference numeral 10. The meat chopper plate 10 is circular in outline and includes a central mounting aperture 12 therethrough. Radiating from the central mounting aperture is a plurality of rows of apertures 14 through which meat or other substances being ground is extruded. It is the apertures 14 which are difficult to clean and for which purpose the improved meat chopper plate cleaner, which is the subject of this invention, has been provided.

A meat chopper plate cleaner is referred to in general by the reference numeral 16 and includes a generally semi-circular plate 18. Rigidly carried by the semi-circular mounting plate 18 and extending upwardly therefrom in an offset relation to the center of the plate is a conduit 20. As is best illustrated in Figure 5, the conduit 20 is internally threaded as at 22 to facilitate the connection of the conduit to a pressurized water supply.

It will be noted that the mounting plate 18 is of the same diameter as the meat chopper plate 10 and that the same is provided with an opening 24 which is in alignment with the opening 12 and the meat chopper plate 10. Disposed within the opening 24 and projecting both outwardly and downwardly therefrom is an elongated mounting pin 26. The upper end portion of the mounting pin 26 is guidingly received in an opening 28 in a lug 30 projecting from the conduit 20, the opening 28 being in alignment with the opening 24. The mounting pin 26 is retained within the openings 24 and 28 for limited vertical movement by a fastening element 32 passed therethrough and disposed between the lug 30 and the mounting plate 18.

Referring now to Figures 1 and 5 in particular, it is seen that the mounting plate 18 is provided with an elongated slot 34 whose longitudinal axis passes through the center of the opening 24. The slot 34 is in direct communication with the conduit 20 and is of a width equal to the diameter of one of the apertures 14 and has a length substantially equal to the length of each row of apertures 14. It will thus be seen that the meat chopper plate 10, when mounted on the meat chopper plate cleaner 16 may be rotated so that each row of apertures 14 may become in alignment with the slot 34, so that water or other fluids passing through the slot 34 under pressure will thoroughly clean the apertures aligned therewith.

In order that the meat chopper plate 10 may be retained on the underside of the mounting plate 18, there is provided spring means for urging the meat chopper plate upwardly against the underside of the mounting plate 18. When the meat chopper plate 10 is mounted on the pin 26, the spring means, which are referred to in general by the reference numeral 36 engage the underside of the meat chopper plate 10 and urges the same upwardly.

The spring means 36 are two in number and are identical. Each of the spring means includes a single length of resilient wire which is doubled upon itself intermediate its ends to form a downwardly projecting loop handle 38 and a shank portion 40. The shank portion 40 terminates in a radiating shank portion 42 which is bifurcated adjacent the outer end thereof and which terminates into a pair of coil spring portions 44. The other end of each coil spring portion 44, which is referred to by the reference numeral 46, terminates in a loop 48 overlying the mounting plate 18 and is secured thereto by a suitable fastener 50 passed therethrough.

In order that the spring means 36 may conveniently urge the meat chopper plate upwardly against the lower face of the mounting plate 18, the bifurcated outer portion of the radiating shank portion 42 is provided with an upwardly directed rounded pin 52 which engages the underside of the meat chopper plate 10. The pins 52 are spaced apart and disposed on opposite sides of the projection of the conduit 20 so as to firmly support the meat chopper plate 10 against the underside of the mounting plate 18 in the vicinity of the slot 34.

After the meat chopper plate 10 has been properly positioned on the meat chopper plate cleaner 16 and retained in position thereon by the spring means 36, the conduit 20 is communicated with a pressurized fluid supply and the meat chopper plate 10 is progressively turned. As the meat chopper plate 10 is progressively turned, the apertures 14 thereof progressively come into alignment with the slot 34 and the fluid passes therethrough under pressure to thoroughly clean the same.

While the meat chopper plate 10 is conveniently removed by moving the mounting pin 26 upwardly, it is necessary to relieve the pressure of the pins 52 thereon. Accordingly, the loops 38 of the spring means 36 terminate adjacent each other whereby they may be grasped by a single finger to be simultaneously urged downwardly to move the pins 52 out of engagement with the meat chopper plate 10.

In view of the foregoing, it is seen that there has been illustrated and described a relative simple, easy to manufacture, meat chopper plate cleaner which may be utilized with a minimum of effort to thoroughly clean conventional meat chopper plates.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A meat chopper plate cleaner comprising a meat chopper plate holder including a slotted mounting plate, means carried by said holder for connecting the same to a pressurized fluid source and conveying the fluid to said slot to discharge out of the same, means for rotatably mounting a meat chopper plate on said mounting plate for rotating into alignment with said slot apertures to be cleaned in the meat chopper plate, said last mentioned means including a mounting pin, spring means carried by said mounting plate for retaining a meat chopper plate on said pin.

2. A meat chopper plate cleaner comprising a meat chopper plate holder including an apertured mounting plate, means carried by said holder for connecting the same to a pressurized fluid source and conveying the fluid to said aperture to discharge out of the same, means for rotatably mounting a meat chopper plate on said mounting plate for rotating into alignment with said aperture apertures to be cleaned in the meat chopper plate, said last mentioned means including a mounting pin, spring means carried by said mounting plate for retaining a meat chopper plate on said pin, said pin being movable relative to said mounting plate to facilitate removal and positioning of a meat chopper plate.

3. A meat chopper plate cleaner comprising a meat chopper plate holder including a mounting plate, means carried by said mounting plate for connecting the same to a pressurized fluid source, said means including a conduit for conveying the fluid to said mounting plate, a slot in said mounting plate communicating with said conduit for discharging fluid from said conduit through said mounting plate, means for rotatably mounting a meat chopper plate on said mounting plate for rotating into alignment with said slot apertures to be cleaned in the meat chopper plate, said last mentioned means including a mounting pin, spring means carried by said mounting plate for retaining a meat chopper plate on said pin.

4. A meat chopper plate cleaner comprising a meat chopper plate holder including a mounting plate, means carried by said mounting plate for connecting the same to a pressurized fluid source, said means including a conduit for conveying the fluid to said mounting plate, a slot in said mounting plate communicating with said conduit for discharging the fluid from said conduit through said mounting plate, means for rotatably mounting a meat chopper plate on said mounting plate for rotating into alignment with said slot apertures to be cleaned in the meat chopper plate, said last mentioned means including a mounting pin, spring means carried by said mounting plate for retaining a meat chopper plate on said pin, said pin being partially supported by said conduit.

References Cited in the file of this patent

UNITED STATES PATENTS

| 891,654 | Baenen | June 23, 1908 |
| 1,332,712 | Couch | Mar. 2, 1920 |
| 1,405,394 | Brauner | Feb. 7, 1922 |
| 1,998,692 | Van Rossem | Apr. 23, 1935 |
| 2,424,259 | Swallow | July 22, 1947 |
| 2,643,465 | Douglass | June 30, 1953 |